US010142709B2

(12) United States Patent
Lewis et al.

(10) Patent No.: US 10,142,709 B2
(45) Date of Patent: Nov. 27, 2018

(54) SYSTEM, METHOD, AND COMPUTER-READABLE MEDIUM FOR IMPLEMENTING INTELLIGENT NETWORK SERVICE FUNCTIONALITY IN A NETWORK

(71) Applicant: Tango Networks, Inc., Richardson, TX (US)

(72) Inventors: Lathan W. Lewis, Dallas, TX (US); Andrew Silver, Frisco, TX (US); Patricia A. Landgren, Plano, TX (US)

(73) Assignee: TANGO NETWORKS, INC., Richardson, TX (US)

( * ) Notice: Subject to any disclaimer, the term of this patent is extended or adjusted under 35 U.S.C. 154(b) by 158 days.

(21) Appl. No.: 15/013,924

(22) Filed: Feb. 2, 2016

(65) Prior Publication Data
US 2016/0156995 A1 Jun. 2, 2016

Related U.S. Application Data

(63) Continuation of application No. 14/542,625, filed on Nov. 16, 2014, now Pat. No. 9,253,552, which is a
(Continued)

(51) Int. Cl.
*H04Q 3/00* (2006.01)
*H04W 4/12* (2009.01)
*H04W 4/16* (2009.01)

(52) U.S. Cl.
CPC ............ *H04Q 3/0029* (2013.01); *H04W 4/12* (2013.01); *H04W 4/16* (2013.01)

(58) Field of Classification Search
CPC ........ H04Q 3/0029; H04W 4/12; H04W 4/16; H04W 88/16; H04W 4/13; H04W 4/14;
(Continued)

(56) References Cited

U.S. PATENT DOCUMENTS 6,269,254 B1 * 7/2001 Mathis ................ H04M 1/2473
379/93.04
6,778,822 B1 * 8/2004 Visser .................. H04Q 3/0029
379/207.02
(Continued)

*Primary Examiner* — Ian N Moore
*Assistant Examiner* — Brian T Le

(57) ABSTRACT

A system, method and computer-readable medium for simulating intelligent network triggers in a network system are provided. A mobile terminal is configured with an intelligent network Simulator adapted to detect call events and originate simulated intelligent network triggers in response to the call events. Call progressions implemented according to the simulated intelligent network triggers may be managed or coordinated by at least one of a carrier-gateway server and an Enterprise-gateway server. Call progressions implemented by simulated intelligent network triggers may be specified according to Enterprise member policies or general Enterprise behaviors. Advantageously, if a carrier network does not support a trigger infrastructure that has capabilities of originating triggers and terminating triggers, or if a roaming agreement is not in place that allows transfer of triggers between carriers, the use of an intelligent network Simulator provides an alternative mechanism for providing IN service functionality without network support for intelligent network triggers.

20 Claims, 9 Drawing Sheets

Related U.S. Application Data continuation of application No. 13/208,155, filed on Aug. 11, 2011, now Pat. No. 8,891,409, which is a continuation of application No. 11/868,215, filed on Oct. 5, 2007, now Pat. No. 8,024,455.

(60) Provisional application No. 60/854,480, filed on Oct. 26, 2006.

(58) Field of Classification Search
CPC .. H04W 4/15; H04L 65/1003; H04L 65/1006; H04L 65/1033
See application file for complete search history.

(56) References Cited

U.S. PATENT DOCUMENTS

| | | | | |
|---|---|---|---|---|
| 2002/0077128 A1* | 6/2002 | Okun | ............... | H04M 3/428 455/458 |
| 2004/0179669 A1* | 9/2004 | Gilbert | ............ | H04M 7/009 379/221.15 |
| 2007/0111752 A1* | 5/2007 | Pazhyannur | ........ | H04W 76/041 455/552.1 |

* cited by examiner

SYSTEM, METHOD, AND COMPUTER-READABLE MEDIUM FOR IMPLEMENTING INTELLIGENT NETWORK SERVICE FUNCTIONALITY IN A NETWORK

CROSS REFERENCE TO RELATED APPLICATIONS

This application is a continuation of U.S. patent application Ser. No. 14/542,625, entitled "SYSTEM, METHOD, AND COMPUTER-READABLE MEDIUM FOR IMPLEMENTING INTELLIGENT NETWORK SERVICE FUNCTIONALITY IN A NETWORK" filed Nov. 16, 2014, issued U.S. Pat. No. 9,253,552, issued Feb. 2, 2016, which is a continuation of U.S. patent application Ser. No. 13/208,155, entitled "SYSTEM, METHOD, AND COMPUTER-READABLE MEDIUM FOR IMPLEMENTING INTELLIGENT NETWORK SERVICE FUNCTIONALITY IN A NETWORK" filed Aug. 11, 2011, issued U.S. Pat. No. 8,891,409, issued Nov. 18, 2014, which is a continuation of U.S. patent application Ser. No. 11/868,215, entitled "SYSTEM, METHOD, AND COMPUTER-READABLE MEDIUM FOR IMPLEMENTING INTELLIGENT NETWORK SERVICE FUNCTIONALITY IN A NETWORK" filed Oct. 5, 2007, issued U.S. Pat. No. 8,024,455, issued Sep. 20, 2011 which claims priority of U.S. Provisional Ser. No. 60/854,480, entitled "ALTERNATIVE METHOD FOR ENABLING INTELLIGENT NETWORK SERVICES" filed Oct. 26, 2006 incorporated herein by reference.

FIELD OF THE INVENTION

The present disclosure relates to telecommunications and, more particularly, to telecommunication systems including alternative mechanisms for implementing intelligent network trigger functionality.

BACKGROUND

The Intelligent Network (IN) comprises a network architecture that allows operators to provide value-added services in addition to the standard telecom services, e.g., Global System for Mobile Communications (GSM) services. IN infrastructure comprises an overlay of a core telecommunications network and provides enhancements to core telephony services.

An IN architecture includes, among other network entities, a Service Switching Function (SSF) or Service Switching Point (SSP). The SSF or SSP may be deployed with a switch or central office and functions as a trigger point at which IN services may be invoked during a call. The switch identifies Detection Points during a call or call setup and, responsive thereto, may invoke a query to a service control point (SCP) that contains service logic which implements the desired service. The query issued by the SSP to the SCP is typically referred to as a trigger. Trigger criteria are defined by the operator and may, for example, include the calling number or the dialed number.

Some carriers may only implement a subset of the triggering infrastructure and not all the triggers that an application requires. Moreover, when a subscriber is roaming, triggers may not be supported between the networks of different carriers. Thus, in many scenarios, IN services may be unavailable to a mobile terminal.

Heretofore, no mechanisms have been provided to support trigger functionality for IN based applications without involving the switching infrastructure.

SUMMARY OF THE INVENTION

Embodiments disclosed herein provide mechanisms for simulating IN triggers in a network system. A mobile terminal may be configured with an IN Simulator that is adapted to originate simulated IN triggers, for example in the form of USSD messages, SMS messages, or another suitable data structure. Call progressions implemented according to the simulated IN triggers may be managed or coordinated by at least one of a carrier-gateway server and an Enterprise-gateway server. Call progressions implemented by the simulated IN triggers may be specified according to Enterprise member policies or general Enterprise behaviors. In an embodiment, the IN Simulator is deployed on a mobile terminal SIM or on a mobile terminal capable of supporting a software client and is registered as a call observer function. The IN Simulator is adapted to generate simulated IN triggers for provisioning of IN service functionality in the network. The IN Simulator may generate messages related to call origination and termination events that facilitate provisioning of IN services without the network support of conventional IN triggers. Advantageously, if a carrier network does not support a trigger infrastructure that has capabilities of originating triggers and terminating triggers—or if a roaming agreement is not in place that allows the transfer of these triggers between carriers—the use of an IN Simulator provides an alternative mechanism that provides the information to a IN based application for providing IN service functionality without network support for IN triggers.

BRIEF DESCRIPTION OF THE DRAWINGS

Aspects of the present disclosure are best understood from the following detailed description when read with the accompanying figures, in which.

DETAILED DESCRIPTION

Figure 1:
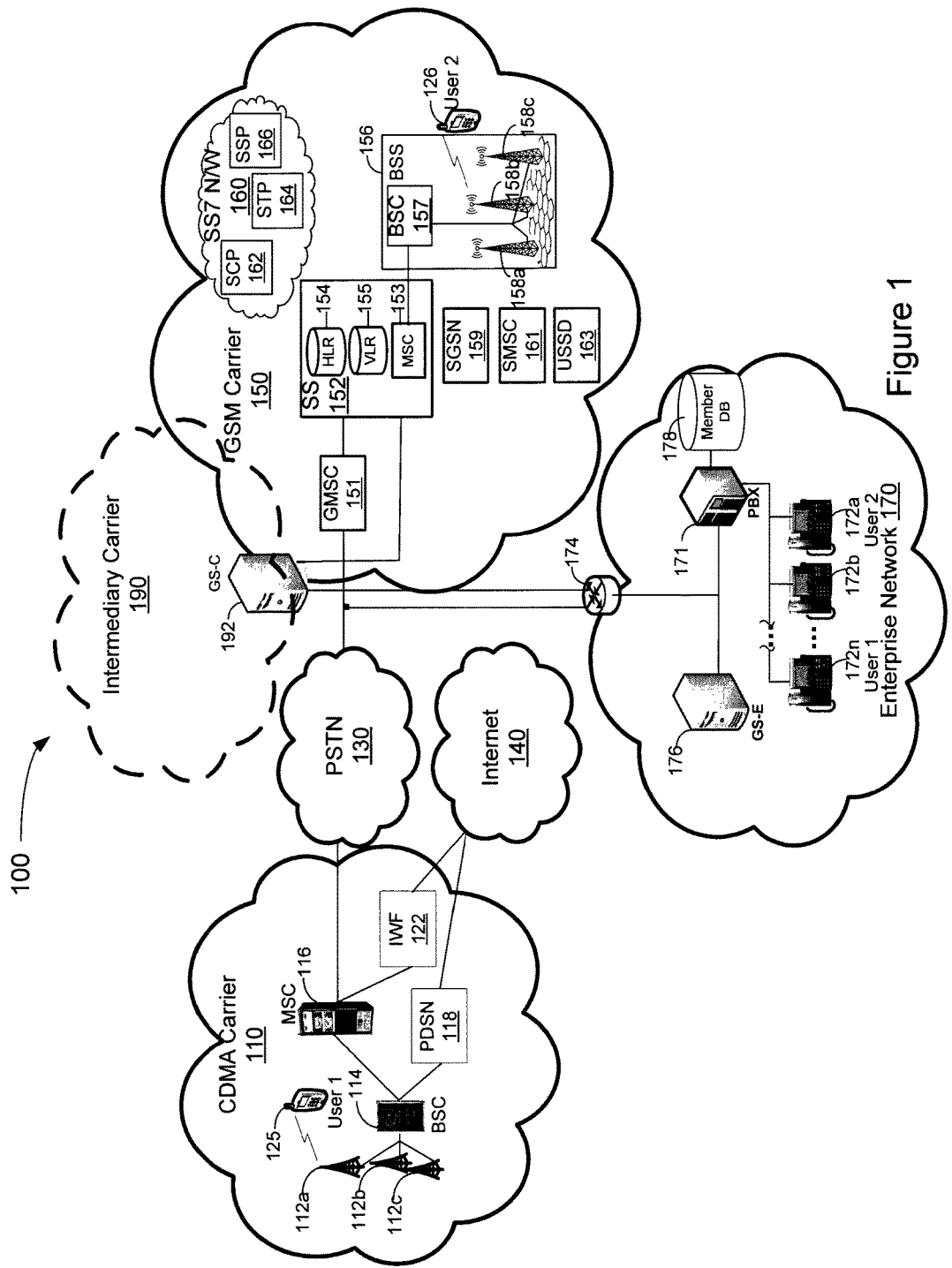
FIG. 1 is a diagrammatic representation of a network system in which embodiments disclosed herein may be implemented for advantage.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a diagrammatic representation of a network system 100 adapted to interconnect various networks and terminals deployed therein in which embodiments disclosed herein may be implemented for advantage. Carrier network 110 may comprise a code division multiple access (CDMA) carrier network, e.g., a CDMA2000-compliant network. Carrier network 110 may include any number of base transceiver stations (BTSs) 112a-112c communicatively coupled with a base station controller (BSC) 114. Each individual BTS 112a-112c under the control of a given BSC may define a radio cell operating on a set of radio channels thereby providing service to a Mobile Terminal (MT) 125. BSC 114 manages the allocation of radio channels, receives measurements from mobile terminals, controls handovers, as well as various other functions as is understood. BSC 114 is interconnected with a mobile services switching center (MSC) 116 that provides mobile terminal exchange services. BSC 114 may be additionally coupled with a packet data serving node (PDSN) 118 that provides a connection point between the CDMA radio access network and a packet network, such as Internet 140, and provides mobility management functions and packet routing services. MSC 116 may communicatively interface with a circuit switched network, such as the public switched telephone network (PSTN) 130, and may additionally be communicatively coupled with an interworking function (IWF) 122 that provides an interface between MSC 116 and Internet 140.

GSM carrier network 150 includes gateway Mobile Switching Center (GMSC) 151 that provides an interface between PSTN 130 and carrier network 150. GMSC 151 determines which MSC currently services a called mobile terminal. Carrier network 150 includes a Switching System (SS) 152 and a Base Station System (BSS) 156. Each of SS 152 and BSS 156 contain a number of functional units well understood by those skilled in the art, and a detailed explanation of the various components is unnecessary. Nevertheless, a cursory review of various components is provided. SS 152 contains an MSC 153, a Home Location Register (HLR) 154, and a Visitor Location Register (VLR) 155. MSCs carry out switching functions and manage the communications between mobile phones and the PSTN 130. HLR 154 comprises the central database that contains details of each mobile phone subscriber that is authorized to use the cellular core network. VLR 155 comprises a database which stores information about all the mobiles terminals that are currently serviced by the associated MSC. VLR 155 stores various information regarding the mobile terminals, such as the current location area identity that specifies a particular BSC that the mobile station is currently serviced by.

Various other sub-systems or functional modules may, and typically are, included in SS 152, such as an Authentication Center, an Equipment Identity Register, or various other functions. A serving general packet radio service (GPRS) support node (SGSN) 159 may be included in GSM carrier network 150 to facilitate provisioning of packet services to and from mobile terminals in network 150. GPRS provides mobility management, session management and transport for Internet Protocol packet services in GSM cellular packet networks.

As is understood, various GPRS infrastructure may be included in network 150 to provide packet services to mobile terminals, and only SGSN 159 of the GPRS core network is depicted to simplify the discussion of embodiments disclosed herein. In general, a gateway GPRS support node may interface the GPRS backbone with an external packet network, such as the Internet.

SGSN 159 may interface with various subsystem of network 150. For example, SGSN 159 may have a Gs interface with MSC 153 and VLR 155 that facilitates paging and station availability notification when performing data transfers. SGSN 159 may additionally have a Gr interface with HLR 154 through which messaging may be performed, for example, over the Mobile Application Part protocol. SGSN 159 may additionally have a Gb interface with packet control unit (PCU) (not shown) of BSS 156 that facilitates connection of BSS 156 with SGSN 159.

Network 150 may also include a signaling system, such as a SS7 network 160. SS7 network 160 provides a set of telephony signaling protocols which are used to set up the vast majority of the world's PSTN telephone calls. SS7 network 160 is also used in cellular networks, such as GSM and UMTS, for circuit switched voice and packet-switched data applications. As is understood, SS7 network 160 includes various signaling nodes, such as any number of service control points (SCPs) 162, signal transfer points (STPs) 164, and service switching points (SSPs) 166.

BSS 156 contains a BSC 157 that may be in communication with and in control of a plurality of BTSs 158a-158c. Each individual BTS 158a-158c under the control of a given BSC 157 may define a radio cell operating on a set of radio channels thereby providing service to an MT, e.g., MT 126.

Network 150 may also include a short message service center (SMSC) 161 adapted to deliver short message service (SMS) messages to mobile terminals. When an SMS message is sent to a user, the SMS message is stored in SMSC 161 which delivers it to the destination mobile terminal when the destination mobile terminal is available. As is known, the SMS message may be delivered via a control channel, e.g., a cell broadcast control channel, or bearer channel. Network 150 may further include a Unstructured Supplementary Service Data (USSD) gateway 163 that provides real-time or instant messaging type phone services. USSD gateway 163 provides for transmission of information of GSM signaling channels. In accordance with embodiments disclosed herein, USSD services may be used in conjunction with an IN simulator deployed on a mobile terminal to provide for IN trigger service functionality as described more fully hereinbelow, although other messaging services, such as SMS, may be similarly utilized for implementing embodiments of the disclosure.

System 100 may include an enterprise network 170 that includes a PBX 171 that provides service to any number of extensions, e.g., enterprise terminal devices 172a-172n. Additionally, PSTN 130 may interface with enterprise network 170, e.g., by a tandem or other switch coupled with enterprise router 174. Enterprise network 170 may include an enterprise gateway server (GS-E) 176 that may be communicatively coupled with a carrier gateway server (GS-C) 192 deployed in, or interconnected with, carrier network 150.

The connection between GS-E 176 and GS-C 192 may be made over, for example, session initiation protocol (SIP) or other protocols. This configuration may enable carrier network 150 to have a central point of control for interacting with multiple enterprises, and may not require the use of SS7 messaging to the enterprise. Rather, it is possible to have a secure IP connection supporting SIP. This is also useful for offering a Centrex solution for interconnecting with a carrier-hosted PBX, or for interconnecting a carrier-hosted gateway server with enterprise-hosted PBX systems. GS-C 192 may support an SS7 point code multiplexer in which only one or two point codes are needed to address all enterprises since GS-C 192 can identify for which enterprise a message is intended. GS-E 176 may be adapted to provision GS-C 192 automatically over an IP interface to manage subscribers, e.g., to add new pilot directory numbers for new subscribers. In the illustrative example, respective users (illustratively designated "User 1" and "User 2") are allocated a respective Enterprise terminal device 172n and 172a as well as mobile terminal 125 and 126.

From an IT organization perspective, GS-E 176 appears as an extension to PBX 171. To carrier network 150, GS-E 176 appears as a standard in-network endpoint for delivering calls. To PBX 171, GS-E 176 appears as a set of standard PBX endpoints (e.g., deskphones, or IP clients). GS-E 176 mediates between the two disparate sets of network protocols and state machines.

GS-C 192 may include the network functions for both voice (gateway MSC) and data (gateway GPRS Support Node or Home Agent), VoIP capability for interconnecting carrier network 150 with Enterprise network 170 thereby eliminating PSTN interconnect charges, a billing gateway, and a next-generation Network Services gateway that enables third party value added services for the enterprise, such as mobile phone activation/de-activation, corporate directory integration based on IMS (IP Multimedia Subsystem), or other services. GS-C 192 may also include the element management subsystem (EMS) and a service management subsystem for the operational support system (OSS).

In the example depicted in FIG. 1, mobile terminals associated with Enterprise network 170 may be configured with an IN Simulator that is adapted to originate simulated IN triggers, e.g., in the form of USSD messages, SMS messages, SIP over GPRS or CDMA evolution-data optimized (EV-DO) or another suitable data structure. Call progressions implemented according to the simulated IN triggers may further be managed or coordinated by GS-C 192 and GS-E 176, e.g., according to Enterprise member policies maintained by member database 178.

PBX 171 may include or interface with an Enterprise member database 178 that stores records or profiles that define services for members of Enterprise network 170. GS-E 176 may interface with member database 178 via a provisioning interface specific to PBX 171. Enterprise member database 178 may include records that specify enterprise members and DID numbers of telephony devices allocated thereto. Additionally, enterprise member database 178 may specify usage policies for Enterprise members that may define, for example, allowable mobile terminal usage such as roaming capabilities, various preferred call progressions to be provided to Enterprise members under various circumstances, and the like. In an embodiment, Enterprise member database 178 may specify particular policy definitions in response to receipt of simulated IN triggers that originate from a member's mobile terminal as described more fully hereinbelow.

In accordance with an embodiment, GS-C 192 may be managed by an Intermediary carrier 190, such as a mobile virtual network operator (MVNO). In this implementation, GS-C 192 is deployed or interconnected with carrier network 150 but is serviced by Intermediary carrier 190. Accordingly, an MVNO may provide mobile services to global Enterprise Customers, e.g., by reselling carrier services, e.g., CDMA or GSM services, combined with Intermediary Carrier Enterprise offerings. Intermediary carrier 190 provides the ability to control HLR profiles of user to route simulated IN-triggers that are originated and processed according to embodiments disclosed herein as described more fully hereinbelow. Moreover, Intermediary carrier 190 may provide Intermediary carrier hosting services to CDMA carriers, such as hosting GS-C and offer Enterprise services for a monthly charge, provide international support for GS-C services as an option to an Enterprise, and the like.

Figure 2:
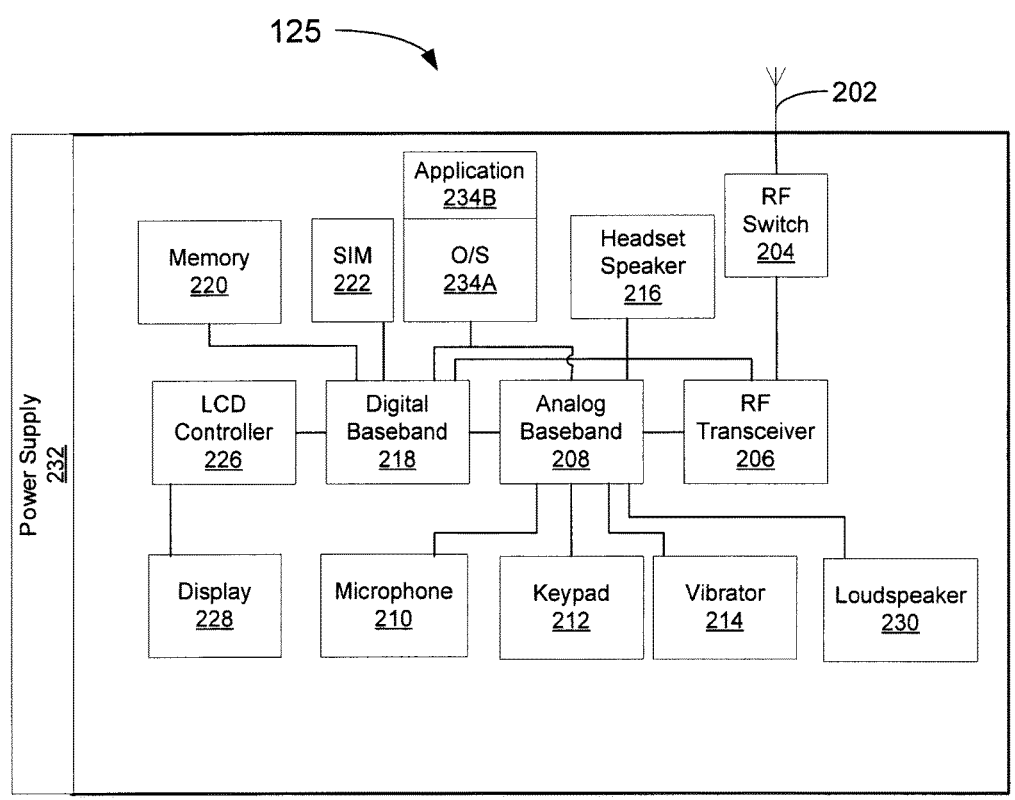
FIG. 2 is a simplified block diagram of an exemplary mobile terminal in which embodiments may be implemented.

FIG. 2 is a simplified block diagram of an exemplary mobile terminal 125 in which embodiments may be implemented. Mobile terminal 125 includes an antenna 202 that may be coupled with an RF switch 204, e.g., a duplexer, coupled with an RF transceiver 206. Transceiver 206 may be coupled with an analog baseband 208 that may handle a variety of analog signal processing functions. In the present example, analog baseband 208 is interconnected with a microphone 210, a keypad 212, a vibrator 214 or other ring alert mechanism, a headset speaker 216, and a loudspeaker 230 for output of speakerphone and incoming call alert audio. Analog baseband 208 may include or interface with an analog to digital converter for converting analog input supplied to microphone 210 into a digital format that may be supplied to a digital baseband 218. Digital baseband 218 may interface with various digital components of mobile terminal 125, such as a memory 220, a subscriber identity module (SIM) 222, and a liquid crystal display controller 226 that drives a display 228. Memory 220 may be implemented as a flash memory, a random access memory, an electronically erasable programmable read-only memory, another solid state device, or a combination thereof. Digital baseband 218 may additionally include or interface with one or more encoders, digital to analog converters, or other modules. An operating system (O/S) 234A may interface with Analog Baseband 208, and Digital Baseband 218 for enabling the execution of client software application 234B. A power supply 232 may be coupled with various system modules as is understood. In accordance with an embodiment, an IN simulator is deployed on SIM 222 or client software application 234B that is adapted to generate simulated IN triggers for provisioning of IN service functionality in a network system such as system 100 depicted in FIG. 1.

The implementation of mobile terminal 125 depicted in FIG. 2 is exemplary only, and mobile terminal 125 may be implemented as any suitable device adapted to interface with a carrier network. Mobile terminal 125, also referred to as a user equipment (UE), may be implemented as a personal digital assistant (PDA), a mobile phone, a computer, or another device adapted to interface with a carrier network.

Figure 3:
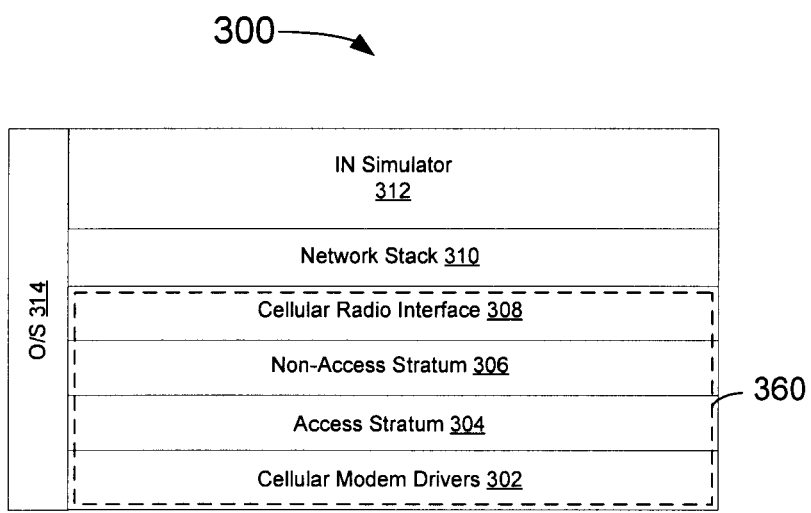
FIG. 3 is a diagrammatic representation of an exemplary software configuration of a mobile terminal adapted for originating simulated intelligent network triggers in accordance with an embodiment.

FIG. 3 is a diagrammatic representation of an exemplary software configuration 300 of a mobile terminal, e.g., mobile terminal 125, adapted for originating simulated IN triggers in accordance with an embodiment. In the exemplary configuration of FIG. 3, the mobile terminal is configured with access network-specific software entities 360, e.g., protocol and driver software associated with a particular access network technology, such as GSM, UMTS, CDMA or another suitable radio access network, and is dependent on the particular cellular network in which the mobile terminal is to be deployed. While configuration 300 depicts a mobile terminal adapted for deployment in a single access network technology type, the mobile terminal may be implemented as a multi-mode device and may accordingly include a plurality of access-specific entities in accordance with an embodiment. The particular configuration 300 is illustrative only and is provided only to facilitate an understanding of embodiments disclosed herein.

In the illustrative example, configuration 300 includes a cellular modem driver 302 for providing a physical interface with the access network in which the mobile terminal is deployed. An access-stratum 304 and a non-access stratum 306 may be included in configuration 300. A cellular radio interface 308 may be communicatively coupled with lower layers of configuration 300 and may additionally interface with network and session management layers, e.g., a network stack 310 such as a TCP/IP layer.

Configuration 300 includes an IN simulator 312 for providing IN service functionality in accordance with an embodiment. Additionally, configuration 300 includes an operating system 314, such as Symbian, Blackberry O/S, or another operating system suitable for mobile applications, and may coordinate and provide control of various components within the mobile terminal.

In an embodiment, IN Simulator 312 is registered as a call observer function in mobile terminal 125. Accordingly, mobile terminal 125 notifies IN Simulator 312 of call origination and termination events, and IN Simulator 312 may generate messages related to call origination and termination events that facilitate provisioning of IN services without the network support of IN triggers. Messages generated by IN Simulator 312 that facilitate provisioning of IN services are referred to herein as simulated IN triggers.

If a carrier network, e.g., GSM carrier network 150, doesn't support a trigger infrastructure that has capabilities of originating triggers and terminating triggers—or if a roaming agreement is not in place that allows the transfer of these triggers between carriers—the use of IN Simulator 312 provides an alternative mechanism that provides the same information to an IN based application in accordance with an embodiment. IN Simulator 312 is thereby adapted to mimic the IN triggering infrastructure and provides mechanisms for implementing IN trigger service functionality without network support for IN triggers.

Various simulated trigger mechanism that are facilitated by IN Simulator 312 are described below. The described trigger mechanisms are illustrative only and are provided to facilitate an understanding of the disclosed embodiments, and implementation of embodiments disclosed herein is not restricted to the described triggers.

To create an IN-simulated origination trigger for Detection Point 2 (DP2) "Collected Information" structure, the following steps may be performed. IN Simulator 312 is registered as a call observer function and receives the call origination event from the originating mobile terminal. IN Simulator 312 converts the origination request into a data message using a method such as USSD, SMS, GPRS or other mechanism that is sent to the IN-based application with the origination message parameters as appropriate. In the exemplary network architecture, the IN-based application may be run by GS-C 192 in conjunction with GS-E 176. That is, the IN service progression is managed by at least one of GS-C 192 and GS-E 176. The IN-based application run by GS-C 192 and/or GS-E 176 performs its application processing and returns the response to the simulated Origination Trigger via the data network such as USSD, SMS, etc. These responses may include Connect, Continue and Release. If the data message contains a Connect response, IN Simulator 312 will set up an originating call with the digits provided in the data message instead of the original dialed digits. If the data message contains a Continue response, IN Simulator 312 will set up an originating call to the original dialed string. If the data message contains a Release response, IN Simulator 312 can provide treatment such as providing a tone to the user or display a message indicating that the call could not be completed.

To create an IN-simulated origination trigger DP for an origin-Busy ("O-Busy") structure the following general procedure may be performed. IN Simulator 312 is registered as a call observer function and receives the busy end point notification from the switching infrastructure. IN Simulator 312 converts the origination request into a data message, e.g., using USSD, SMS, etc., that is sent to the IN based application, e.g., run by GS-C 192, with the origination message parameters as appropriate. The IN based application performs its application processing and returns the response to the Origination Trigger via a data message.

To create an IN-simulated origination trigger DP for an origin-No Answer ("0-No Answer") structure, the following general procedure may be performed. IN Simulator 312 is registered as a call observer function and receives a disconnect notification from the network prior to the call being answered. IN Simulator 312 converts the origination request into a data message to the IN based application with the origination message parameters as appropriate. The IN based application performs its application processing and returns the response to the Origination Trigger via a data message.

To create an IN-simulated origination trigger DP for an origin-Answer ("O-Answer") structure the following general procedure may be performed. IN Simulator 312 is registered as a call observer function and receives the answer indication from the switching network. IN Simulator 312 converts the origination request into a data message that is transmitted to the IN based application with the origination message parameters as appropriate. The IN based application performs its application processing and returns the response to the Origination Trigger via a data message.

To create an origination trigger DP for an origin-Disconnect ("0-Disconnect") structure, the following general procedure may be performed. IN Simulator 312 is registered as a call observer function and receives the disconnect indication from the network or the end key input from the user. IN Simulator 312 converts the origination request into a data message that is transmitted to the IN based application run by the GS-C with the origination message parameters as appropriate. The IN based application performs its application processing and returns the response to the IN-simulated Origination Trigger via a data message.

To create an IN-simulated termination trigger DP12 for "Terminating Attempt Authorized" the following general procedure may be performed. IN simulator 312 receives the call termination event from the mobile terminal. IN simulator 312 converts the call termination into a data message and transmits the data message to the IN based application with the termination message parameters as appropriate. The IN based application performs its application processing and returns the response to the IN-simulated Termination trigger via a data message. These responses may include Connect, Continue or Release. If the data message contains a Connect response, IN simulator 312 uses the Call Deflection Supplementary Service to redirect the call to the endpoint provided in the connect response. If the data message contains a Continue response, IN Simulator 312 allows the call to be delivered and proceeds to ring the mobile terminal. If the data message contains a Release response, IN Simulator 312 does not accept the call and terminates to switching infrastructure.

An IN-simulated Termination Trigger DP13 for "Busy" can be created by IN Simulator 312 in the case when the IN based application infrastructure also provides an alternative to call waiting services. This is because a busy determination is typically handled by the switching infrastructure without any knowledge by the handset. However, this can be replicated by implementing an alternative call waiting service in accordance with an embodiment. The following procedure may generally be performed to create an IN-simulated DP13 "Busy" trigger. IN Simulator 312 receives notification of a terminating call. A data message is sent to the IN application, and the IN application sends back a connect message to indicate to connect the call to the IN application. The data message received by IN simulator 312 contains the connect-to information. IN simulator 312 uses the Call Deflection Supplementary Service to redirect the call to the end point received in the connect response. The IN application, receiving the call termination, routes the call to the terminating mobile via the switching infrastructure. IN Simulator 312 will again receive notification of this terminating call from the IN application. The call should be presented to the user with the original calling line ID information provided. IN simulator 312 receives another notification during the current call. This call is not answered so that end point is receiving ringing. A data message is sent to the IN application. The IN application sends back a connect message to indicate to connect the call to the IN application. The data message received by IN simulator 312 contains the connect to information. IN simulator 312 uses the Call Deflection Supplementary Service to redirect the call to the end point received in the connect response. IN simulator 312 provides a call waiting indication to the user via a tone and the display of who is calling. If the user decides to accept the incoming call by pressing "send", IN simulator 312 issues a data message to the IN application. When the IN application receives the message that the user wants to accept the new incoming call, it answers the new call and connects to the current leg that it has up to the mobile and places the current leg on hold. IN Simulator 312 receives notification of the terminating call while currently handling the two established calls. A data message is sent to the IN application, and the IN application sends back a connect message to indicate to connect the call to the IN application. The data message received by IN simulator 312 contains the connect to information. IN simulator 312 uses the Call Deflection Supplementary Service to redirect the call to the IN application. The IN application, receiving the call termination and knowing that the user is currently handling two calls—gives busy treatment to the new call and can create a DP-13 to itself or other application requiring the DP-13 Busy trigger.

In accordance with an embodiment, an IN-simulated Terminating Trigger for DP14 "No Answer" may be generated and processed according to two general procedures. A No Answer DP can occur in two ways—when the mobile is not registered on the network, and when the mobile rings but the user chooses not to answer. These two general scenarios are processed according to disclosed embodiments as follows. When the mobile terminal is not registered on the network, the call forwarding number of the mobile is set to the IN application When a call is received at the IN application, the IN application creates a no answer trigger for this received call.

When the mobile terminal is registered but the user doesn't answer the call, IN Simulator 312 is informed that a terminating call has been delivered to the phone and detects that the user has selected the end button when the call is "ringing". In this instance, IN Simulator 312 generates and sends a data message to the IN application providing the IN-simulated No Answer Trigger. The IN application may then provide either a release or connect response to the termination trigger. If IN simulator 312 receives a connect response, IN simulator 312 uses the Call Deflection Supplementary Service to redirect the call to the IN application. If IN simulator 312 receives a release response, the call can be released from the switching infrastructure.

To create an IN-simulated termination trigger for DP15 "Answer", the following general procedure may be performed. IN simulator 312 receives the send or answer indication from the mobile terminal. IN simulator 312 converts the event into a data message to the IN-based application with the termination message parameters as appropriate. The IN based application performs it application processing and returns the response to the Termination trigger via a data message.

To create an IN-simulated termination trigger for DP17 "Disconnect" the following general procedure may be performed. IN simulator 312 receives the end key or disconnect indication from the mobile terminal. IN simulator 312 converts the event in to a data message and sends the data message to the IN based application with the termination message parameters as appropriate. The IN based application performs its application processing and returns the response to the IN-simulated Termination trigger via a data message.

To create an IN-simulated termination trigger for DP18 "Abandon" the following general procedure may be performed. IN simulator 312 receives the disconnect indication from the network prior to call answering state. IN simulator 312 converts the event in to a data message that is transmitted to the IN-based application with the termination message parameters as appropriate. The IN based application performs its application processing and returns the response to the IN-simulated Termination trigger via a data message.

Figure 4:
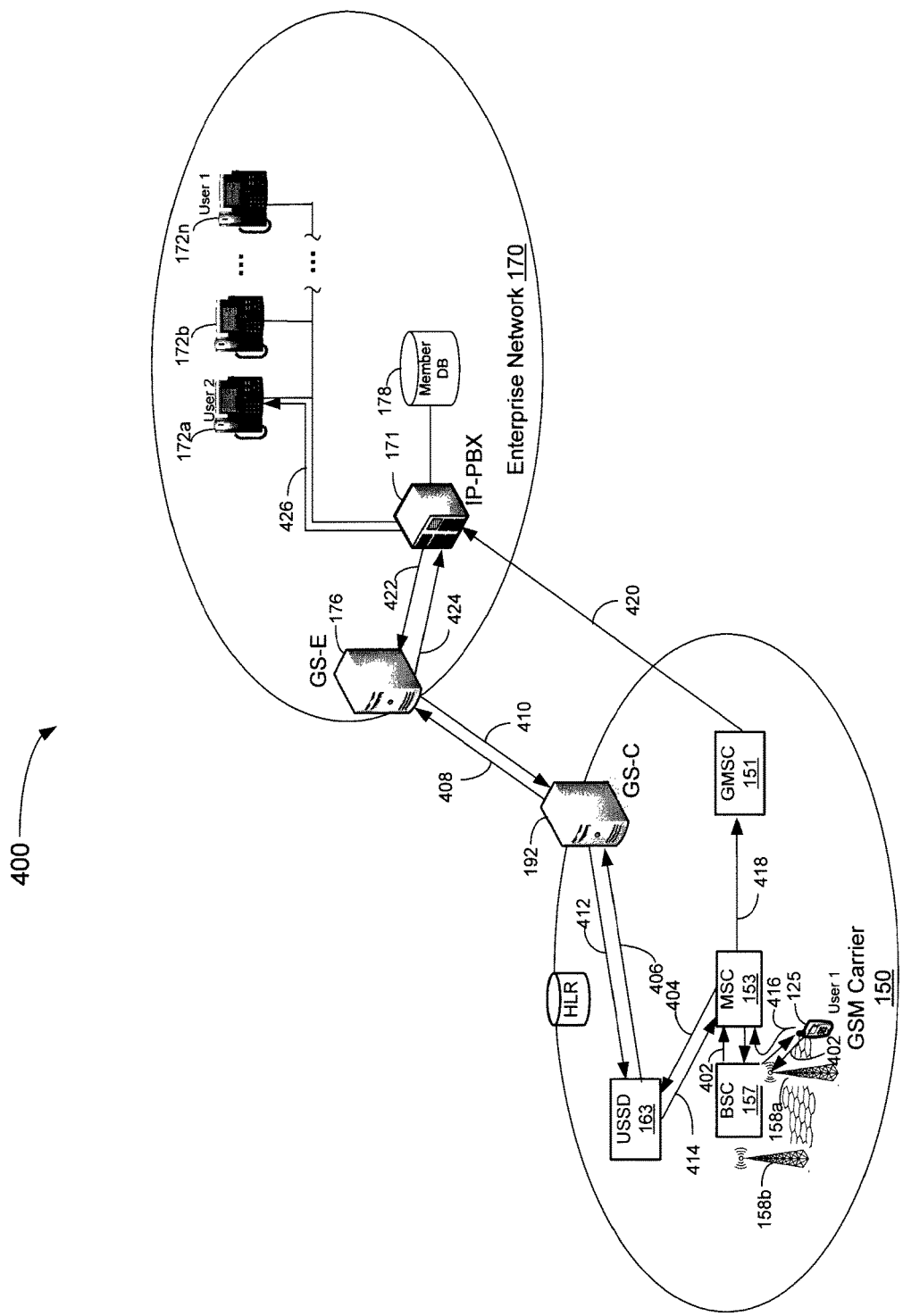
FIG. 4 is a diagrammatic representation of a signaling flow of a mobile originated call to an Enterprise member implemented in accordance with an embodiment.

FIG. 4 is a diagrammatic representation of a signaling flow 400 of a mobile originated call to an Enterprise member implemented in accordance with an embodiment. In the present example, assume the originating mobile terminal 125 is equipped with an instance of IN Simulator 312 described with reference to FIG. 3, and that the user of mobile terminal 125 uses abbreviated dialing for calling User 2's Enterprise telephone device 172a. That is, User 1 placing the call dials User 2's Enterprise extension rather than the full directory number assigned to device 172a. Upon entry of the dialed number and a call setup command, e.g., by selecting Send at mobile terminal 125, IN simulator 312 identifies the call origination event. IN simulator 312 then collects the call information suitable for generating an IN-simulated origination trigger (DP 2), and creates an IN-simulated DP 2 trigger from the collected call information. In the illustrative example, the collected information corresponding to a DP 2 trigger is formulated in a USSD message. The USSD message is then transmitted through the radio access network, e.g., via BTS 158a and BSC 157, wherein the USSD message is received at MSC 153 (step 402). MSC 153 accordingly routes the USSD message to USSD gateway 163 (step 404) that in turn forwards the USSD message to GS-C 192 (step 406). Thus, in this manner, the collected information formulated in the USSD message is transmitted to GS-C 192 in a manner that replaces a trigger event detected at an SSP. Accordingly, carrier network 150 is not required to support the IN infrastructure or, alternatively, mobile terminal 125 is not required to have any IN service agreement with carrier network 150 for invoking an IN service function.

On receipt of the USSD message, GS-C 192 may recognize the called or calling party as an Enterprise member and issue an INVITE message to GS-E 176 (step 408). GS-E 176 may query Enterprise member database 178 to determine an appropriate call progression, e.g., whether to release the call, terminate the call with the dialed party's fixed enterprise telephony device, the dialed party's mobile terminal, or other suitable call progression. In the present example, assume GS-E 176 replies to GS-C 192 with a SIP redirection, e.g., a SIP 302 message, that includes a redirection address, e.g., a pilot directory number (PDN) assigned to device 172a (step 410). GS-C 192, in turn, includes the PDN in a USSD message that is transferred to USSD gateway 163 (step 412) which routes the USSD to mobile terminal 125 (step 414).

The USSD including the PDN is then conveyed to IN simulator 312 which invokes an outbound call at mobile terminal 125 directed to the PDN (step 416). MSC, on receipt of the call setup request, determines the PDN to be a directory number external to carrier network 150 and routes the call set up to GMSC 151 (step 418). GSMC 151 recognizes the PDN as a pilot number of PBX 171 and routes the call termination attempt thereto (step 420). PBX 171 may then issue an INVITE message with the PDN as the called party directory number to GS-E 176 (step 422). GS-E 176 resolves the user directory number associated with the PDN and replies to PBX 171 (step 424), e.g., with the extension assigned to User 2's land line telephony device 172a. The call set up is then completed with device 172a (step 426).

Figure 5:
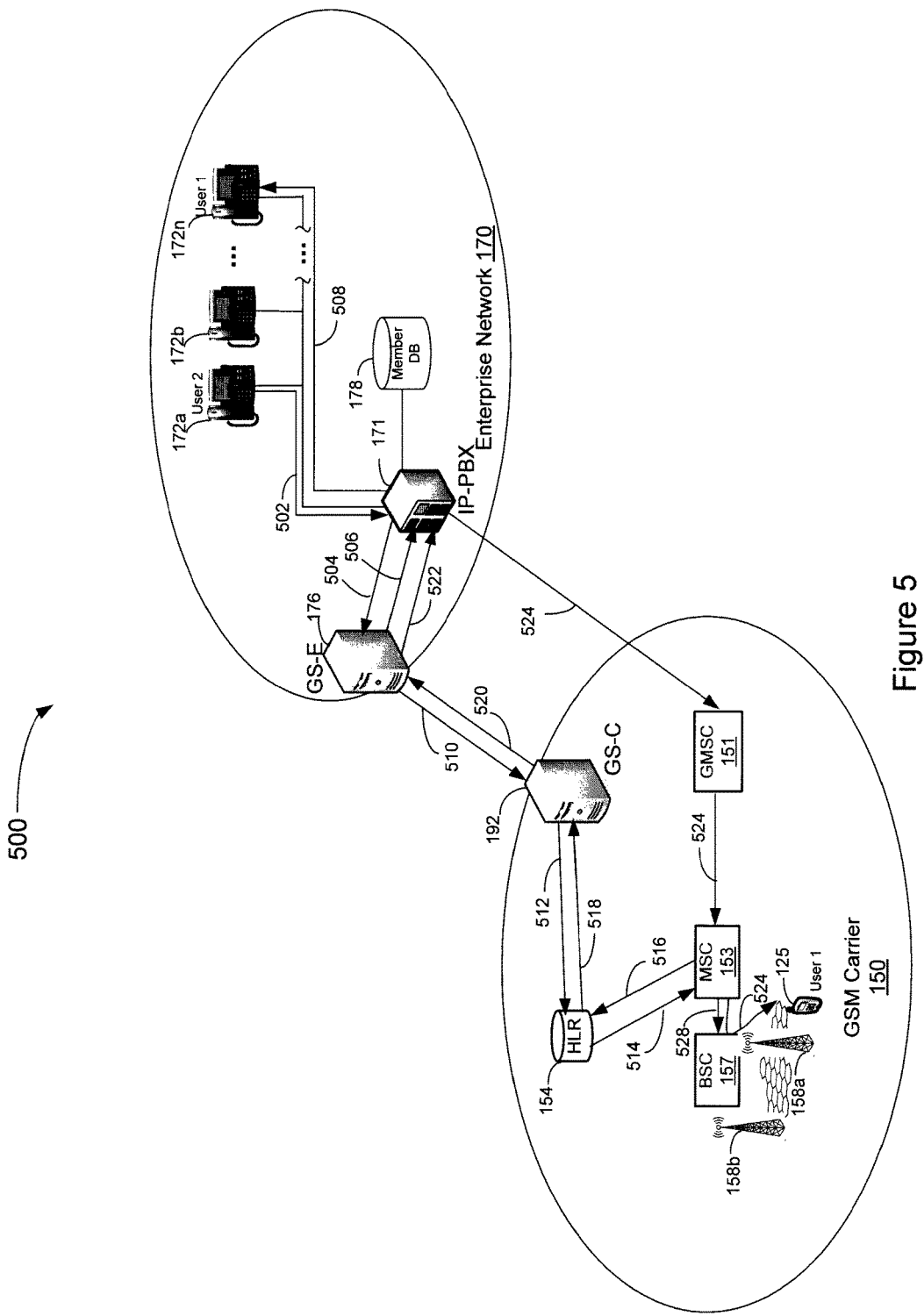
FIG. 5 is a diagrammatic representation of a signaling flow of an Enterprise member placing a call to another Enterprise member from an enterprise landline telephony device implemented in accordance with an embodiment.

FIG. 5 is a diagrammatic representation of a signaling flow 500 of an Enterprise member placing a call to another enterprise member from an enterprise landline telephony device 172a implemented in accordance with an embodiment. Assume for illustrative purposes that the called number is supplied as the short code, or extension, of Enterprise telephony device 172n assigned to User 1, and that the call is placed at Enterprise telephony device 172a. The call set up request is transmitted from device 172a to PBX 171 (step 502), which in turn transmits a telephone application program interface (TAPI) function call to GS-E 176 (step 504). In accordance with an embodiment, GS-E 176 may maintain or interface with a record allocated for called User 1 that associates the directory number of Enterprise telephony device 172n, the short code of device 172n, and the directory number of mobile terminal 125. In this instance, the call may be "forked" or generally placed in parallel to the called Enterprise telephony device as well as mobile terminal 125 associated with the called user. To this end, an INVITE message is transmitted from GS-E 176 to PBX 171 that specifies the extension of device 172n (step 506). The INVITE may then be transmitted to device 172n (step 508).

A second INVITE message may be generated and transmitted from GS-E 176 to GS-C 192 that specifies the directory number of mobile terminal 125 (step 510). Transmission and generation of the INVITE message that specifies mobile terminal 125 may be made substantially concurrently with the INVITE message transmitted toward the Enterprise landline telephony device 172n. GS-C 192 may then transmit a send routing information (SRI) message to HLR 154 that maintains subscription records of mobile terminal 125 (step 512). HLR 154 then identifies the servicing MSC 153 of mobile terminal 125 and transmits a provide roaming number (PRN) message thereto (step 514). MSC 153 then transmits a PRI response message to HLR 154 that includes the mobile station roaming number assigned to mobile terminal 125 (step 516) which is forwarded to GS-C 192 (step 518). GS-C 192 then transmits a SIP redirection message that includes the mobile station roaming number of mobile terminal 125 as a temporary local directory number (TLDN) to GS-E 176 (step 520). An INVITE message is then transmitted to PBX 171 (step 522) that includes the TLDN number that allows PBX 171 to complete the call setup through GMSC 151 which uses the TLDN for routing the call to mobile terminal 125 via the appropriate MSC 153 (step 524). Accordingly, both devices 125 and 172n may provide an incoming call alert, and User 1 assigned devices 125 and 172n may accept the call at either device.

Figure 6:
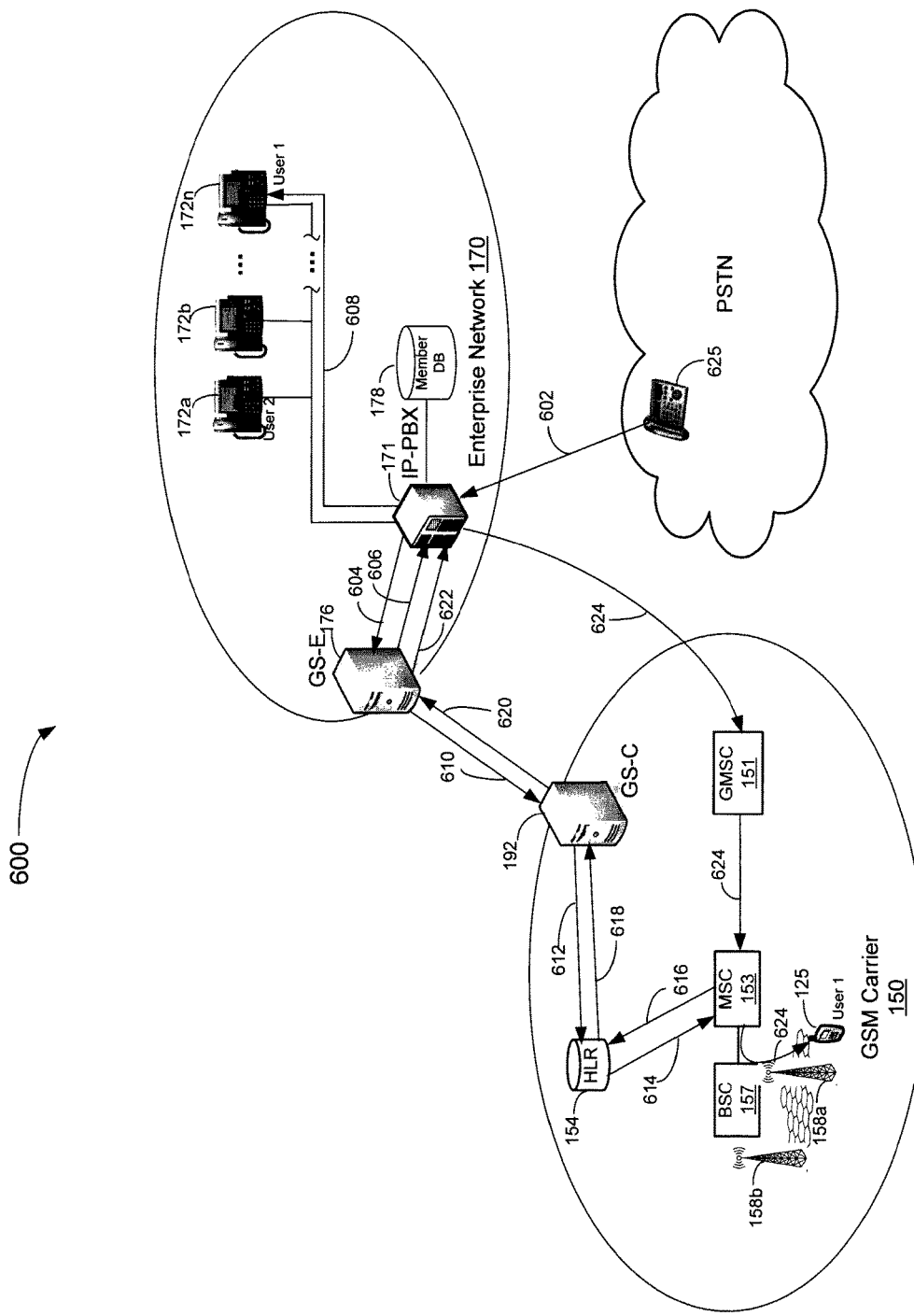
FIG. 6 is a diagrammatic representation of a signaling flow of a call originated from a PSTN device to an Enterprise member in accordance with an embodiment.

FIG. 6 is a diagrammatic representation of a signaling flow 600 of a call originated from a PSTN device 625 to an Enterprise member in accordance with an embodiment. Assume for illustrative purposes that the called number is the directory number assigned to landline device 172n assigned to User 1. The call set up request is transmitted from device 625 to PBX 171 (step 602), which in turn transmits a TAPI function call to GS-E 176 (step 604). GS-E 176 may evaluate the dialed number and identify mobile terminal 125 as being associated with landline device 172n. That is, GS-E 176 may identify mobile terminal 125 and device 172n as both assigned to the called Enterprise member, and may determine the directory number of mobile terminal 125. Thus, GS-E 176 may facilitate establishing a call origination to both landline device 172n and mobile terminal 125. To this end, GS-E 176 transmits an INVITE message to PBX 171 that specifies the extension of device 172n (step 606), and PBX 171 provides an alert to device 172n (step 608).

A second INVITE message may be generated and transmitted from GS-E 176 to GS-C 192 that specifies the directory number of mobile terminal 125 (step 610). Transmission and generation of the INVITE message that specifies mobile terminal 125 may be made substantially concurrently with the INVITE message transmitted toward the Enterprise network for alerting device 172n of an incoming call. GS-C 192 may then transmit an SRI message to HLR 154 that maintains subscription records of mobile terminal 125 (step 612). HLR 154 then identifies the servicing MSC 153 of mobile terminal 125 and transmits a PRN message thereto (step 614). MSC 153 then transmits a PRN response message to HLR 154 that includes the mobile station roaming number assigned to mobile terminal 125 (step 616) which is forwarded to GS-C 192 (step 618). GS-C 192 then transmits a SIP redirection message that includes the mobile station roaming number of mobile terminal 125 as a temporary local directory number (TLDN) to GS-E 176 (step 620). An INVITE message is then transmitted to PBX 171 (step 622) that includes the TLDN number that allows PBX 171 to complete the call setup through GMSC 151 which uses the TLDN for routing the call to mobile terminal 125 via the appropriate MSC 153 (step 624). Accordingly, both devices 172n and 125 assigned to the called Enterprise member, User 1, have a termination attempt placed thereto.

Figure 7:
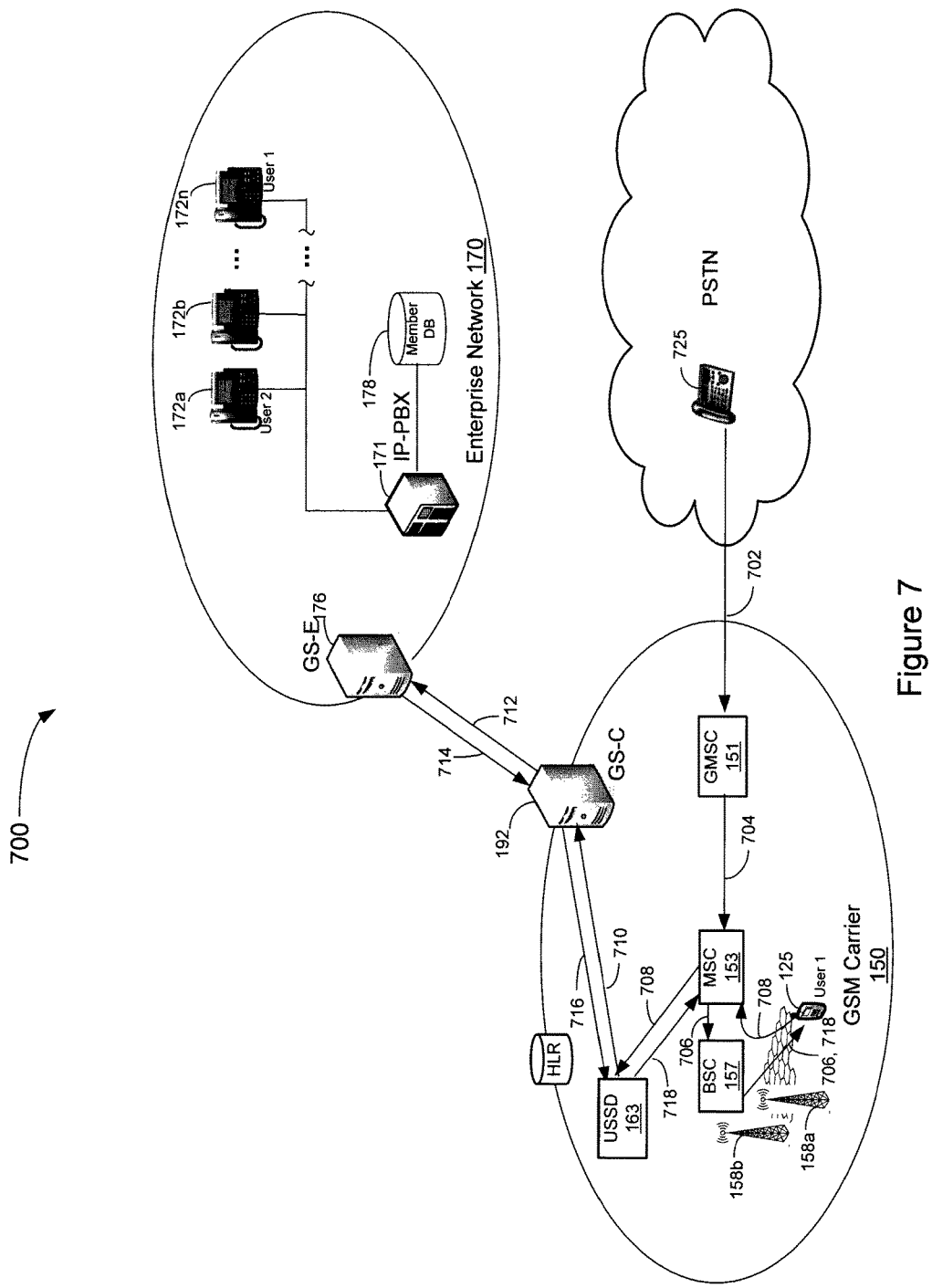
FIG. 7 is a diagrammatic representation of a signaling flow of a call originated from a PSTN device to an Enterprise member in accordance with an embodiment.

FIG. 7 is a diagrammatic representation of a signaling flow 700 of a call originated from a PSTN device 725 to an Enterprise member in accordance with an embodiment. In the illustrative example, assume the dialed number is assigned to an Enterprise member's mobile terminal 125. The call set up request is transmitted from device 725 to GMSC 151 (step 702), which in turn forwards the call request to MSC 153 currently servicing mobile terminal 125 (step 704). In the present example, assume mobile terminal 125 is configured with an IN Simulator 312. Accordingly, on receipt of the call termination attempt at mobile terminal 125, IN Simulator 312 receives or is otherwise notified of the call termination event. In accordance with an embodiment, IN Simulator 312 may be configured to recognize that carrier network 150 does not support IN triggers, or that IN triggers or otherwise unavailable for mobile terminal 125, e.g., by a lack of a suitable agreement with carrier network 150. IN simulator 312 may then temporarily suppress or otherwise prohibit an incoming call alert notification at mobile terminal 125. IN Simulator 312 collects event information suitable for creating an IN-simulated DP 12 trigger in the form of a data message, e.g., a USSD message, that is to be transmitted to the IN based application hosted by GS-C 192 with the termination message parameters as appropriate. The USSD message is then transmitted through the radio access network to USSD gateway 163 (step 708) that in turn forwards the USSD message to GS-C 192 (step 710). Thus, in this manner, the collected information formulated in the USSD message is transmitted to GS-C 192 in a manner that replaces a conventional IN trigger. Accordingly, carrier network 150 is not required to support the IN infrastructure or, alternatively, mobile terminal 125 is not required to have any IN service agreement with carrier network 150 for invoking an IN service.

On receipt of the USSD message, GS-C 192 may recognize the called party as an Enterprise member and issue an INVITE message to GS-E 176 (step 712) and may await receipt of a response as to how to proceed with the call. GS-E 176 may query Enterprise member database 178 to determine an appropriate call progression, e.g., whether to terminate the call with the dialed party's fixed enterprise telephony device, the dialed party's mobile terminal, or other suitable call progression. In the illustrative example, assume GS-E 176 replies to GS-C 192 with a policy allowance, e.g., via a SIP 302 message with a Continue directive (step 714). The determination of a policy allowance by GS-E 176 may be made, for example, according to the called Enterprise member's profile or according to a general Enterprise behavior. GS-C 192, in turn, formulates a USSD message addressed to mobile terminal 125 that is transferred to USSD gateway 163 which includes a directive to continue with the call (step 716) which routes the USSD message to mobile terminal 125 (step 718). The USSD message is conveyed to IN Simulator 312 which reads the Continue directive therefrom. Accordingly, IN Simulator 312 invokes processing to continue with the call termination at which point an alert is generated, e.g., by IN Simulator 312, to notify the user of the incoming call. The call termination may then be completed when the call is accepted at mobile terminal 125.

Figure 8:
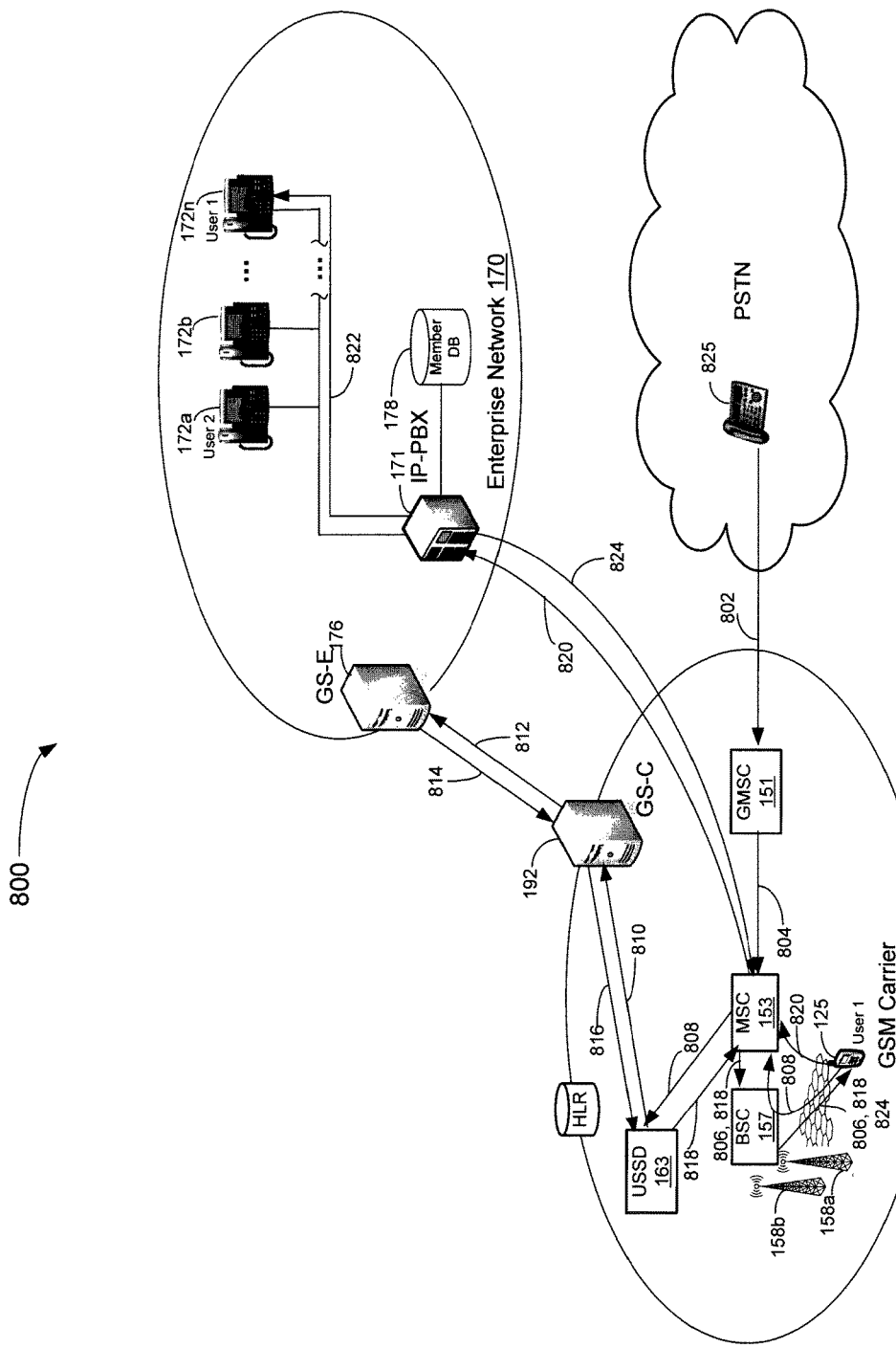
FIG. 8 is a diagrammatic representation of a signaling flow of a call originated from a PSTN device to an Enterprise member in accordance with an embodiment.

FIG. 8 is a diagrammatic representation of a signaling flow 800 of a call originated from a PSTN device 825 to an Enterprise member in accordance with an embodiment. In the illustrative example, assume the dialed number is assigned to an Enterprise member's mobile terminal 125. The call set up request is transmitted from device 825 to GMSC 151 (step 802), which in turn forwards the call request to MSC 153 currently servicing mobile terminal 125 (step 804). In the present example, assume mobile terminal 125 is configured with an IN Simulator 312. Accordingly, on receipt of the inbound call attempt at mobile terminal 125, IN Simulator 312 receives or is otherwise notified of the call termination event. In accordance with an embodiment, IN Simulator 312 may be configured to recognize that carrier network 150 does not support IN triggers, or that IN triggers or otherwise unavailable for mobile terminal 125. IN simulator 312 may then temporarily suppress or otherwise prohibit an incoming call alert notification at mobile terminal 125. IN Simulator 312 collects event information suitable for creating an IN-simulated DP 12 trigger in the form of a data message, e.g., a USSD message, to the IN based application with the termination message parameters as appropriate. The USSD message is then transmitted through the radio access network to USSD gateway 163 (step 808) that in turn forwards the USSD message to GS-C 192 (step 810). GS-C 192 hosts an IN based application that performs application processing and returns the response to the IN-simulated Termination trigger via a data message. These responses may include Connect, Continue or Release. Thus, in this manner, the collected information formulated in the USSD message is transmitted to GS-C 192 in a manner that replaces a conventional IN trigger. Accordingly, carrier network 150 is not required to support the IN infrastructure or, alternatively, mobile terminal 125 is not required to have any IN service agreement with carrier network 150 for invoking an IN service.

On receipt of the USSD message, GS-C 192 may recognize the called party as an Enterprise member and issue an INVITE message to GS-E 176 (step 812) and await call processing instructions therefrom. GS-E 176 may determine a policy for processing the call, e.g., release, continue, or connect the call based on, for example, the called Enterprise member's profile. To this end, GS-E 176 may query Enterprise member database 178 to determine an appropriate call progression, e.g., whether to allow or disallow the call, whether to terminate the call with the dialed party's fixed Enterprise telephony device, the dialed party's mobile terminal, or other suitable call progression. In the illustrative example, assume GS-E 176 replies to GS-C 192 with a policy allowance, e.g., via a SIP 302 message (step 814). In the present example, assume the policy allowance message transmitted from GS-E 176 to GS-C 192 includes a directive to continue with the call, and that the call is to be redirected through Enterprise network 170. To this end, the reply provided to GS-C 192 from GS-E 176 will include a PDN to which the call is to be deflected. GS-C 192, in turn, formulates a USSD message addressed to mobile terminal 125 that is transferred to USSD gateway 163 which includes a call deflect directive (step 816) which routes the USSD message to mobile terminal 125 (step 818). The USSD message is conveyed to IN Simulator 312 which reads the call deflect directive and PDN therefrom. IN Simulator 312 then initiates the call deflection procedure, e.g., by transmitting a Call Deflection Invoke message that includes the PDN as the Deflect To Number to MSC 153 (step 820). In the present example, the PDN number is recognized as associated with PBX 171. Accordingly, the call termination attempt is routed to PBX 171 (step 820), at which point a termination attempt may be made with telephony device 172n associated with User 1 (step 822). Likewise, a termination attempt may additionally be made to mobile terminal 125 that is redirected from Enterprise network 170 back to mobile terminal 125 (step 824).

Figure 9:
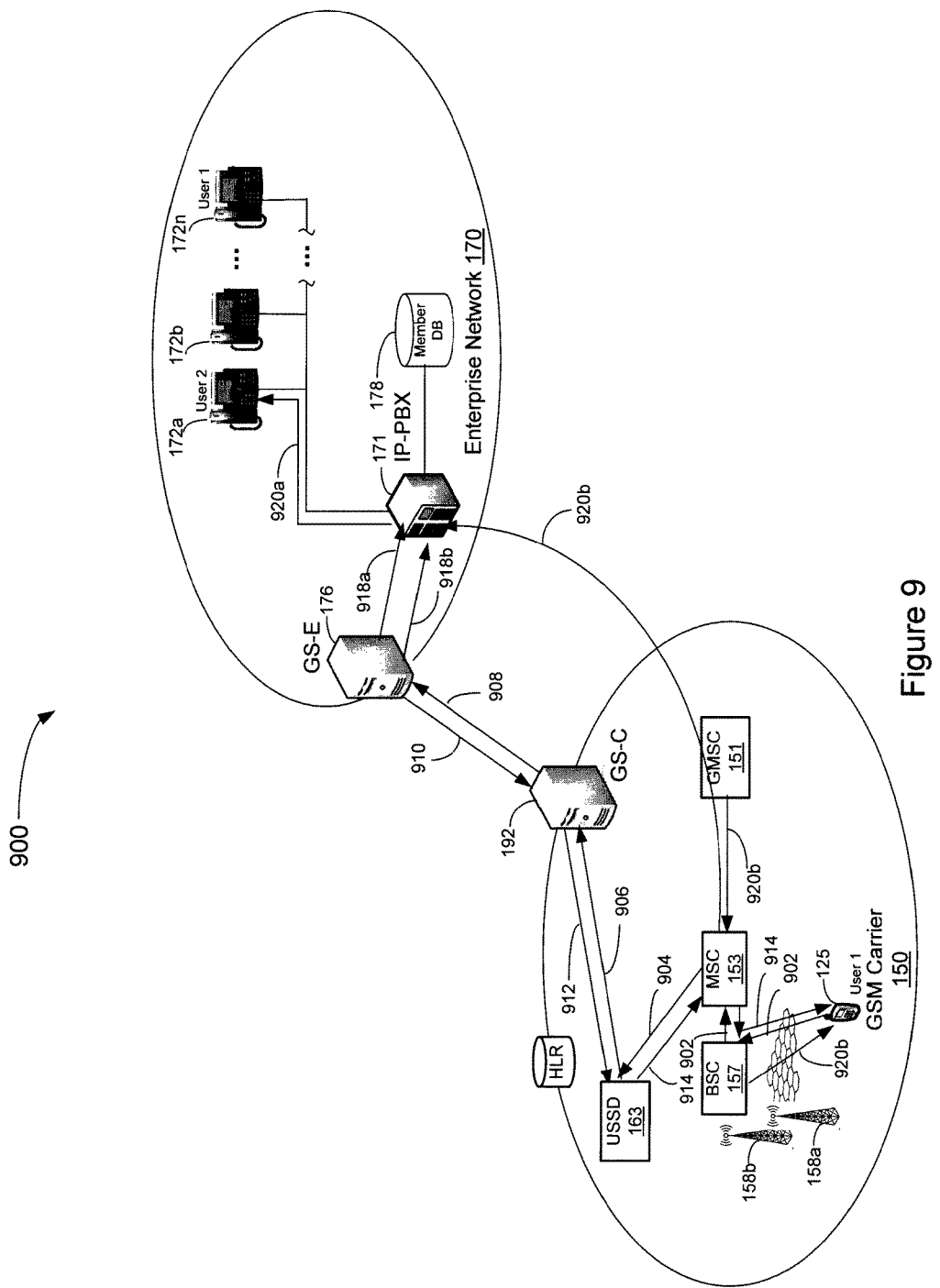
FIG. 9 is a diagrammatic representation of a signaling flow of a call originated from an Enterprise member's mobile terminal to another Enterprise member implemented in accordance with an embodiment.

FIG. 9 is a diagrammatic representation of a signaling flow 900 of a call originated from an Enterprise member (User 1) mobile terminal 125 to another Enterprise member (User 2) implemented in accordance with an embodiment. In the illustrative example, assume mobile terminal 125 is adapted with an IN Simulator 312 and the dialed number is assigned to the called party's Enterprise landline telephone device 172a. Upon entry of the dialed number and a call setup command, e.g., by selecting Send at mobile terminal 125, IN simulator 312 identifies the call origination event. IN simulator 312 then collects the call information suitable for generating an IN-simulated origination trigger DP 2, and creates a simulated DP 2 trigger from the collected information. In the illustrative example, the collected information corresponding to a DP 2 trigger is formulated in a USSD message. The USSD message is then transmitted through the radio access network, e.g., via BTS 158a and BSC 157, wherein the USSD message is received at MSC 153 (step 902). MSC 153 accordingly routes the USSD message to USSD gateway 163 (step 904) that in turn forwards the USSD message to GS-C 192 (step 906). GS-C 192 hosts an IN based application that performs application processing and returns the response to the IN-simulated Termination trigger via a data message. These responses may include Connect, Continue or Release.

On receipt of the USSD message, GS-C 192 may recognize the party as an Enterprise member and communicate the call origination to GS-E 176 (step 908). GS-E 176 may query Enterprise member database 178 to determine an appropriate call progression, e.g., to connect, continue, or release the call, and if the call is to be connected, whether to connect the call with the dialed party's fixed enterprise telephony device, the dialed party's mobile terminal or other alternative. In the illustrative example, assume the mobile terminal is currently operating at an international carrier or other carrier for which mobile terminal 125 faces long distance charges for terminating the call. In this instance, GS-E 176 may recognize mobile terminal 125 as having roamed into an international carrier or other carrier for which long distance charges may apply. Accordingly, GS-E 176 may reply to GS-C 192 with a call back response (step 910). GS-C 192 formulates a USSD message that includes the call back directive and transmits the USSD message to USSD gateway 163 (step 912) which, in turn, forwards the USSD message to mobile terminal 125 (step 914). The Call Back directive is read from the USSD message by IN Simulator 312. IN Simulator 312 is configured to recognize the Call Back directive and place mobile terminal 125 in a wait state.

Prior, subsequent, or substantially concurrent with the generation and transmission of the response from GS-E 176 to GS-C 192 at step 910, GS-E 176 may transmit an INVITE message to PBX 171 that is transmitted to Enterprise device 172a, that is the device to which the original call was placed (step 918a), which conveys the call termination attempt to device 172a (step 920a). Substantially concurrently with transmission of the INVITE message directed to device 172a, a second INVITE message addressed to mobile terminal 125 that originated the call is transmitted from GS-E 176 to PBX 171 (step 918b), which in turn conveys the termination attempt to mobile terminal 125 (step 920b). On receipt of the termination attempt at mobile terminal 125, IN Simulator 312 may be configured to recognize the inbound call as a call back for the previously placed call, and IN Simulator 312 may be configured to output a ringback tone, rather than a ring tone associated with an inbound call. Thus, from a user perspective, the inbound call termination appears as an outbound call consistent with the call placement made by the user of mobile terminal 125. Alternatively, the ringback tone may be generated upon transmission of the USSD message at step 902 and continued throughout the call back procedure until the called party answers the call at device 172a. Accordingly, the calling party may be connected with the called party through the call back procedure, and international charges for the call may be substantially lower by receiving a call termination fee, rather than a call origination fee, applied for the roaming terminal 125.

As described, embodiments disclosed herein provide mechanisms for simulating IN triggers in a network system. A mobile terminal may be configured with an IN Simulator that is adapted to originate simulated IN triggers, for example in the form of USSD messages, SMS messages, or another suitable data structure. Call progressions implemented according to the simulated IN triggers may be managed or coordinated by at least one of a carrier-gateway server and an Enterprise-gateway server. Call progressions implemented by the simulated IN triggers may be specified according to Enterprise member policies or general Enterprise behaviors. The IN Simulator may be deployed on a mobile terminal SIM or on a mobile terminal capable of supporting a software client and is registered as a call observer function. The IN Simulator is adapted to generate simulated IN triggers for provisioning of IN service functionality in the network. The IN Simulator may generate messages related to call origination and termination events that facilitate provisioning of IN services without the network support of conventional IN triggers. Advantageously, if a carrier network does not support a trigger infrastructure that has capabilities of originating triggers and terminating triggers—or if a roaming agreement is not in place that allows the transfer of these triggers between carriers—the use of an IN Simulator provides an alternative mechanism that provides the information to a IN based application for providing IN service functionality without network support for IN triggers.

Although the specific network architecture and nomenclature in which a mobile terminal featuring an IN Simulator are depicted and described according to the GSM, it is understood that this is done so for illustrative purposes only and that the network architecture on which embodiments disclosed herein may be applied is not limited to any particular standard, but rather may be equivalently implemented on any other communications system supporting any variety of cellular communication systems, e.g. D-AMPS, CDMA, IS-41, ANSI-41, UMTS, etc.

The illustrative block diagrams depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single computer processor or multiple computer processors. Additionally, various steps of embodiments of the invention may provide one or more data structures generated, produced, received, or otherwise implemented on a computer-readable medium, such as a memory.

Although embodiments of the present disclosure have been described in detail, those skilled in the art should understand that they may make various changes, substitutions and alterations herein without departing from the spirit and scope of the present disclosure.

The invention claimed is:

1. A method, comprising:
   collecting, by an intelligent network simulator application operating on a mobile terminal, information related to a call event;
   transmitting, by the intelligent network simulator application, the information collected by the intelligent network simulator application, to a first gateway server communicatively coupled to a carrier network;
   informing a second gateway server, communicatively coupled with an enterprise network, of a simulated intelligent network trigger;
   informing, by the second gateway server, the intelligent network simulator application of a response to the simulated intelligent network trigger; and
   based on the response to the simulated intelligent network trigger, performing, by the intelligent network simulator application, at least one of establish the call event, answer the call event, disconnect the call event and abandon the call event.

2. The method of claim 1, wherein receiving the call event comprises receiving one of a call origination event and a call termination event.

3. The method of claim 1, comprising generating a message including the information collected by the intelligent network simulator application, wherein the message is one of an unstructured supplementary service data message, a short message service message, a SIP message over at least one of GPRS, EDGE, UMTS, CDMA EV-DO, WiMAX and LTE.

4. The method of claim 1, comprising transmitting the message to a network node utilizing one of an unstructured supplementary service data gateway, a short message service center, or a data gateway for at least one of GPRS, EDGE, UMTS, CDMA EV-DO, WiMAX and LTE.

5. The method of claim 1, comprising processing the call according to a policy of an enterprise network.

6. The method of claim 1, wherein the intelligent network simulator application is stored on a subscriber identity module of the mobile terminal.

7. The method of claim 1, wherein the mobile terminal is capable of supporting a software client.

8. The method of claim 1, further comprising configuring the intelligent network simulator application as a call observer function on the mobile terminal.

9. A non-transitory computer-readable storage medium having computer-executable instructions being executed by a processor to perform:
   collecting, by an intelligent network simulator application operating on a mobile terminal, information related to a call event;
   transmitting, by the intelligent network simulator application, the information collected by the intelligent network simulator application, to a first gateway server communicatively coupled to a carrier network;
   informing a second gateway server, communicatively coupled with an enterprise network, of a simulated intelligent network trigger;
   informing, by the second gateway server, the intelligent network simulator application of a response to the simulated intelligent network trigger; and
   based on the response to the simulated intelligent network trigger, performing, by the intelligent network simulator application, at least one of establish the call event, answer the call event, disconnect the call event and abandon the call event.

10. The non-transitory computer-readable storage medium of claim 9, wherein the call event comprises one of a call origination event and a call termination event.

11. The non-transitory computer-readable storage medium of claim 9, comprising generating a message including the information collected by the intelligent network simulator application, wherein the message is one of an unstructured supplementary service data message, a short message service message, and a SIP message over at least one of GPRS, EDGE, UMTS, CDMA EV-DO, WiMAX, and LTE.

12. The non-transitory computer-readable storage medium of claim 9, wherein the processor is further configured to perform transmitting the message to a network node comprising one of a unstructured supplementary service data gateway, a short message service center, a data gateway for at least one of GPRS, EDGE, UMTS, CDMA EV-DO, WiMAX, and LTE.

13. The non-transitory computer-readable storage medium of claim 9, wherein the processor is further configured to perform processing the call according to the policy of an enterprise network.

14. The non-transitory computer-readable storage medium of claim 9, wherein the intelligent network simulator application is stored on a subscriber identity module of the mobile terminal.

15. The non-transitory computer-readable storage medium of claim 9, wherein the mobile terminal is capable of configuring the intelligent network simulator application as a call observer function on the mobile terminal.

16. A system, comprising:
   a carrier network communicatively coupled with a first gateway server;
   a second gateway server communicatively coupled with an enterprise network and with the first gateway server; and
   an intelligent network simulator application that operates on a mobile terminal which collects information related to a call event;
   wherein the intelligent network simulator application transmits the information collected by the intelligent network simulator application, to the first gateway server;
   wherein the second gateway server is informed of a simulated intelligent network trigger;
   wherein the second gateway server informs the network simulator application of a response to the simulated intelligent network trigger; and wherein, based on the response to the simulated intelligent network trigger, the intelligent network simulator application performs at least one of establish the call event, answer the call event, disconnect the call event and abandon the call event.

17. The system of claim 16, wherein the call event comprises one of a call origination event and a call termination event.

18. The system of claim 16, wherein the intelligent network simulator application transmits a message that includes the information collected by the intelligent network simulator application, wherein the message is one of an unstructured supplementary service data message, a short message service message, and a SIP message over at least one of GPRS, EDGE, UMTS, CDMA EV-DO, WiMAX and LTE.

19. The system of claim 16, wherein the intelligent network simulator application is stored on a subscriber identity module of the mobile terminal.

20. The system of claim 16, wherein the intelligent network simulator application identifies the call event and generates the message.

* * * * *